United States Patent
Girotto et al.

(10) Patent No.: US 11,156,764 B2
(45) Date of Patent: Oct. 26, 2021

(54) BONDED OPTICAL SYSTEMS AND APPLICATIONS THEREOF

(71) Applicant: IDEAL Industries Lighting LLC, Sycamore, IL (US)

(72) Inventors: Claudio Girotto, Santa Barbara, CA (US); Theodore Lowes, Lompoc, CA (US); Chandan Bhat, Goleta, CA (US); Mark Youmans, Goleta, CA (US)

(73) Assignee: IDEAL INDUSTRIES LIGHTING LLC, Racine, WI (US)

( * ) Notice: Subject to any disclaimer, the term of this patent is extended or adjusted under 35 U.S.C. 154(b) by 51 days.

(21) Appl. No.: 15/186,222

(22) Filed: Jun. 17, 2016

(65) Prior Publication Data
US 2017/0363795 A1 Dec. 21, 2017

(51) Int. Cl.
*F21V 8/00* (2006.01)

(52) U.S. Cl.
CPC ......... *G02B 6/0088* (2013.01); *G02B 6/0053* (2013.01); *G02B 6/0065* (2013.01)

(58) Field of Classification Search
CPC ............................ G02B 6/0043; G02B 6/0065
USPC ....................................................... 362/606
See application file for complete search history.

(56) References Cited

U.S. PATENT DOCUMENTS

| | | | | |
|---|---|---|---|---|
| 5,396,350 A * | 3/1995 | Beeson | ............... | G02B 6/0053 349/62 |
| 5,947,578 A * | 9/1999 | Ayres | .................. | G02B 6/0021 362/255 |
| 5,995,690 A * | 11/1999 | Kotz | ...................... | G02B 6/001 385/129 |
| 8,033,706 B1 * | 10/2011 | Kelly | .................. | G02B 6/0036 362/307 |
| 2003/0123243 A1 * | 7/2003 | Eiraku | ................. | G06F 1/1601 362/632 |
| 2004/0170009 A1 * | 9/2004 | Ho | ....................... | G02B 6/0071 362/633 |
| 2005/0084993 A1 * | 4/2005 | Schmidt | .............. | G02B 6/0041 438/22 |
| 2007/0279727 A1 * | 12/2007 | Gandhi | ............... | G02B 6/0035 359/242 |
| 2010/0177533 A1 * | 7/2010 | Griffiths | .............. | G02B 6/0036 362/605 |
| 2010/0288614 A1 * | 11/2010 | Ender | .................. | G02B 6/0061 200/5 A |
| 2010/0302803 A1 * | 12/2010 | Bita | ..................... | G02B 6/0036 362/606 |
| 2011/0141547 A1 * | 6/2011 | Griffiths | .............. | G02B 6/0043 359/291 |

(Continued)

*Primary Examiner* — Bryon T Gyllstrom
(74) *Attorney, Agent, or Firm* — J. Clinton Wimbish; Nexsen Pruet, PLLC

(57) ABSTRACT

In view of delamination and other failure mechanisms, bonded assemblies are described herein comprising one or more reinforcement members reducing deflection of the assemblies under applied flexural loads, wherein the reinforcement members do not materially interfere with the functionality of the bonded assemblies. In one aspect, waveguide assemblies are provided. A waveguide assembly, in some embodiments, comprises a waveguide body and light extraction elements bonded to the waveguide body, wherein at least one reinforcement member is coupled to the waveguide assembly at one or more locations to reduce deflection of the waveguide assembly under an applied flexural load.

34 Claims, 17 Drawing Sheets

(56) References Cited

U.S. PATENT DOCUMENTS

| | | | |
|---|---|---|---|
| 2011/0222311 A1* | 9/2011 | Kinder | G02B 6/002 362/611 |
| 2012/0113679 A1* | 5/2012 | Boonekamp | G02B 6/0063 362/607 |
| 2012/0287631 A1* | 11/2012 | Sheng | G02B 6/0061 362/235 |

* cited by examiner

BONDED OPTICAL SYSTEMS AND APPLICATIONS THEREOF

FIELD

The present invention relates to bonded assemblies and, in particular, to optical assemblies comprising bonded optical elements.

BACKGROUND

Components having differing properties and/or compositions can be bonded to one another to provide apparatus of desired functionality. Plates or foils, for example, are bonded to one another resulting in laminate constructions for various applications. Significant efforts are undertaken to inhibit or preclude delamination, cracking and other failure mechanisms. However, the intended functionality of the bonded assembly can restrict bonded surface area between components or impose other limitations compromising bond integrity. In such cases, the bond is often not sufficient to withstand mechanical demands placed on the bonded assembly. Optical systems, for example, can present very limited bonding area between individual components due to optical performance requirements. An optical waveguide, for example, mixes and directs light emitted by one or more light sources, such as one or more light emitting diodes (LEDs). A typical optical waveguide generally includes a waveguide body and one or more extraction elements. The extraction element(s) determine how light is removed by controlling where and in what direction the light exits the waveguide. By appropriately shaping waveguide surfaces, one can control the flow of light across the extraction element(s). Selecting the spacing, shape and other characteristic(s) of the extraction elements affects the appearance of the waveguide and its resulting angular distribution of emitted light and efficiency.

For many lighting applications, extraction elements are bonded to the waveguide body with adhesive. The amount of adhesive is limited to maintain desired optical performance. Light extraction elements can be individually placed and bonded to the waveguide body. Alternatively, light extraction elements may be part of an extractor plate. Given the limited amount of adhesive and small bonded area, flexural loads or other stresses applied to waveguide body can work to delaminate or de-bond extraction elements. FIG. 1, for example, illustrates de-bonding of extraction elements 11 from the waveguide body 10 in response to a flexural load 13 applied to the waveguide body 10. In the embodiment of FIG. 1, the extraction elements 11 are part of an extractor plate 14. The flexural load can apply tensile stress and/or shear stress resulting in the de-bonding.

SUMMARY

In view of these failure mechanisms, bonded assemblies are described herein comprising one or more reinforcement members reducing deflection of the assemblies under applied flexural loads, wherein the reinforcement members do not materially interfere with the functionality of the bonded assemblies. In one aspect, waveguide assemblies are provided. A waveguide assembly, in some embodiments, comprises a waveguide body and light extraction elements bonded to the waveguide body, wherein at least one reinforcement member is coupled to the waveguide assembly at one or more locations to reduce deflection of the waveguide assembly under an applied flexural load. As detailed further herein, the light extraction elements can be part of a light extractor plate. Alternatively, the light extraction elements are not part of a light extractor plate and are independently arranged on one or more surfaces of the waveguide body.

In another aspect, bonded assemblies comprising surface features are described herein. An assembly, in some embodiments, comprises a plurality of discrete surface features bonded to a first plate, wherein at least one reinforcement member is coupled to the assembly at one or more locations to reduce deflection of the assembly under an applied flexural load while not altering the surface features and/or function of the assembly. In some embodiments, the surface features are also associated with a second plate resulting in bonding of the first plate and the second plate via the surface features.

These and other embodiments are described further in the following detailed description.

DETAILED DESCRIPTION

Figure 1:
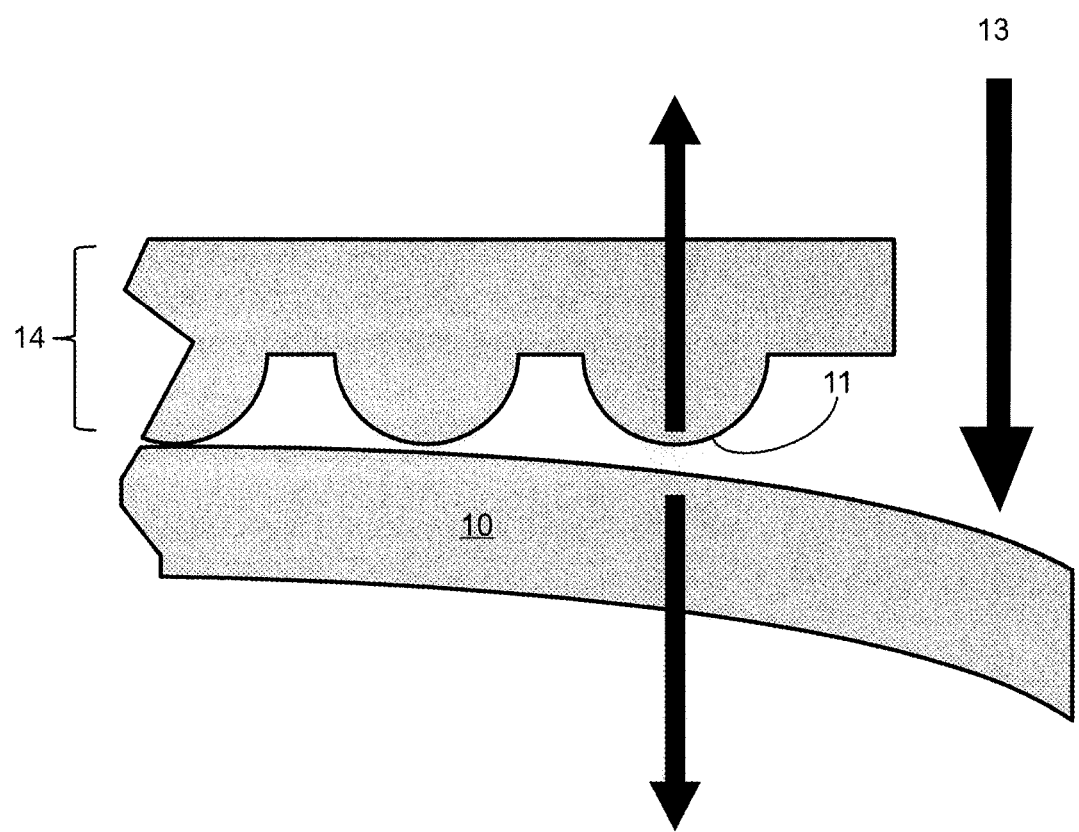
FIG. 1 illustrates de-bonding of extraction elements from the waveguide body in response to a flexural load applied to the waveguide body.

Embodiments described herein can be understood more readily by reference to the following detailed description and examples and their previous and following descriptions. Elements, apparatus and methods described herein, however, are not limited to the specific embodiments presented in the detailed description and examples. It should be recognized that these embodiments are merely illustrative of the principles of the present invention. Numerous modifications and adaptations will be readily apparent to those of skill in the art without departing from the spirit and scope of the invention.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figures 2A, 2B:
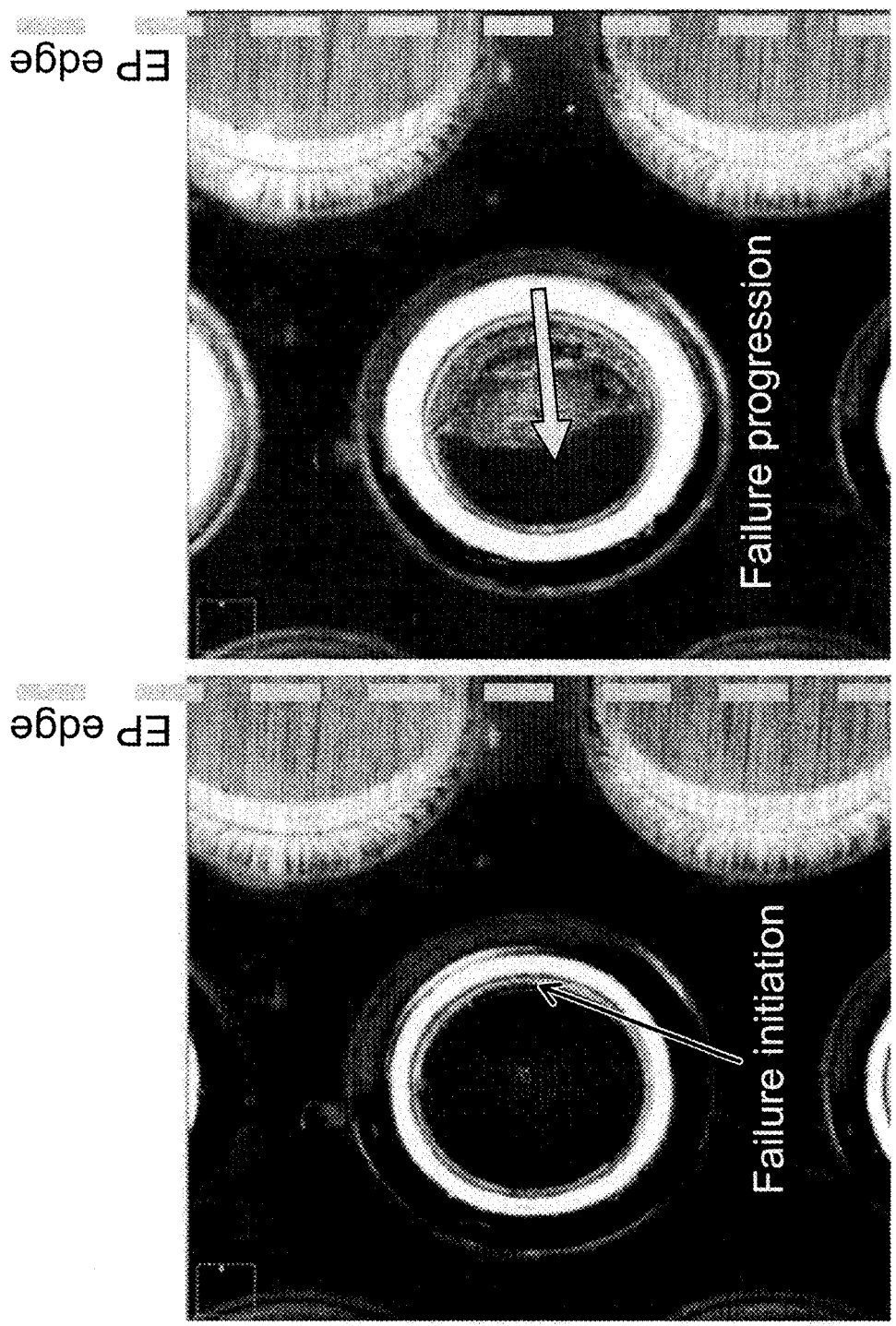
FIGS. 2A and 2B illustrate initiation and progression of extraction element de-bonding respectively according to some embodiments.

As discussed in relation to FIG. 1, light extraction elements can de-bond from the waveguide body in response to flexural loads and/or other stresses applied to the waveguide body. Careful investigation has revealed that de-bonding can be particularly severe when loads and/or stresses are applied at locations of the waveguide body where extraction elements are absent. For example, flexural loads applied to one or more edges of the waveguide body can initiate and propagate de-bonding of extraction elements. In many cases, de-bonding of an extraction element initiates along an edge of the extraction element proximate the edge of the extractor plate and proceeds in an inward direction. FIGS. 2A and 2B illustrate one embodiment of initiation and progression of extraction element de-bonding respectively. Initiation in FIG. 2A occurs at along the arc closest to the edge of the extractor plate (EP) experiencing the flexural load. De-bonding and failure progresses across the extraction element as illustrated in FIG. 2B. Other de-bonding mechanisms of an extraction element are also possible. De-bonding may initiate at other edges of the extraction element and progress in directions parallel to and/or toward the extractor plate edge. In further embodiments, de-bonding may initiate in a central region of the extractor element and progress outward in one or more radial directions. De-bonding mechanism of an extractor element can be influenced by several considerations including, but not limited to, direction(s) of applied flexural load, extractor element geometry and bonding footprint of the extractor element with the waveguide body.

In view of de-bonding and other failure modes, a waveguide assembly described herein comprises a waveguide body and light extraction elements bonded to the waveguide body, wherein at least one reinforcement member is coupled to the waveguide assembly at one or more locations to reduce deflection of the waveguide assembly under an applied flexural load. Turning now to specific components, the waveguide body can be formed of any suitable waveguide material including acrylic, silicone, polycarbonate, glass and/or other suitable optically transmissive materials operable to support total internal reflection (TIR). In some embodiments, for example, the waveguide body is formed of polymethyl methacrylate (PMMA) or derivative thereof. Waveguide material can be selected according to various considerations including the mechanical and/or chemical demands of the environment in which the waveguide body will operate. In some embodiments, more rigid materials may be selected to assist in reducing deflection in response to an applied flexural load. Moreover, the waveguide body can have any dimensions and shape not inconsistent with the objectives of the present invention. In some embodiments, the waveguide body has thickness of 1 mm to 10 cm. Waveguide body thickness can be selected according to several considerations including, but not limited to, waveguide size and associated mechanical requirements, body material and/or desired geometry. In some embodiments, the waveguide body is provided thickness sufficient to assist in deflection reduction.

The waveguide body, in some embodiments, is generally planar or plate-like. A planar waveguide body can be polygonal, such as square, rectangular, hexagonal, etc. Alternatively a planar waveguide body can be circular, elliptical or exhibit at least one curved edge or surface.

Figure 3A:
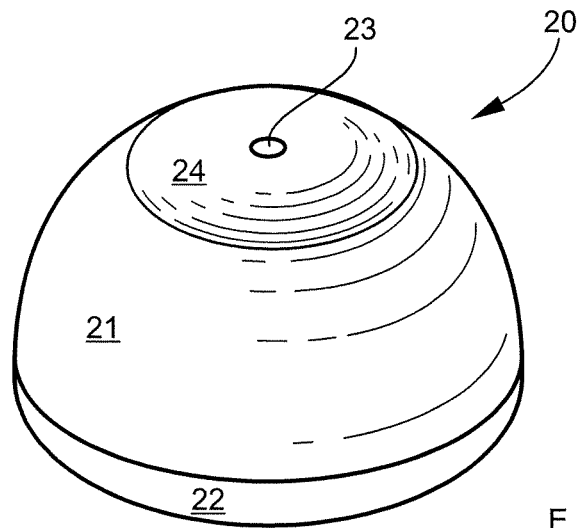
FIGS. 3A-3C illustrate geometry and features of a light extraction element according to some embodiments.
Figure 3B:
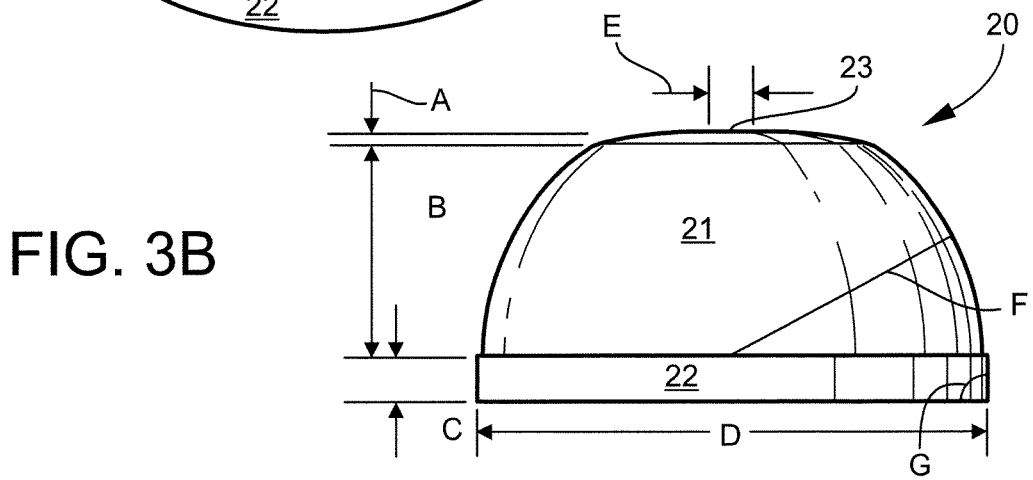
Figure 3C:
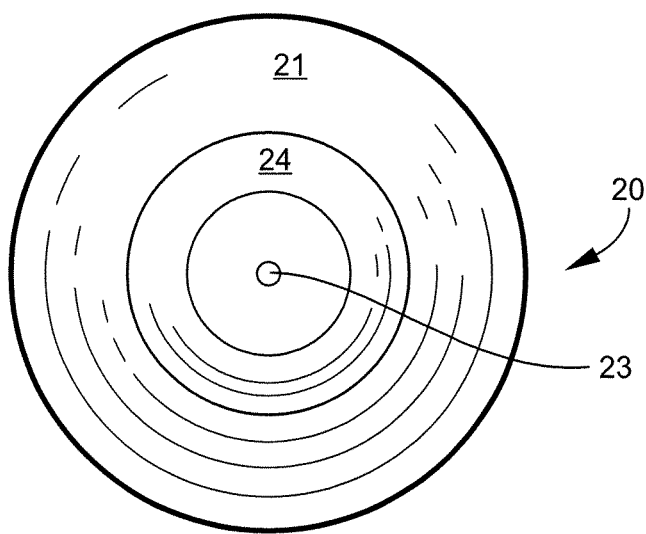
Figure 4A:
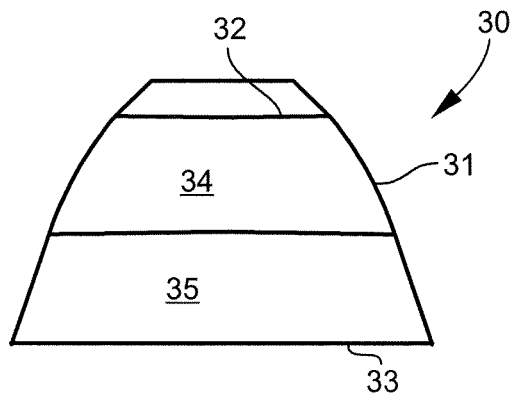
FIGS. 4A and 4B illustrate geometry and features of a light extraction element according to some embodiments.
Figure 4B:
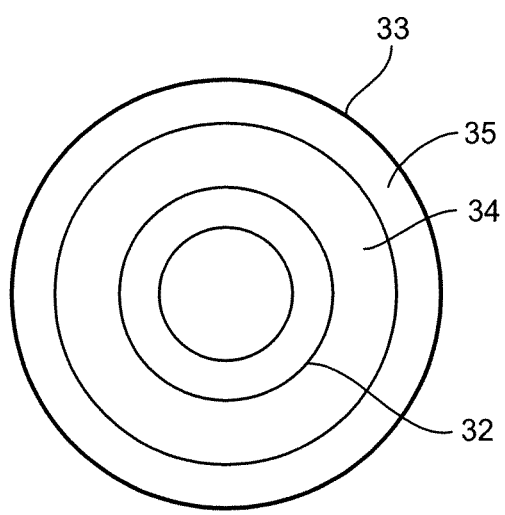
Figure 5A:
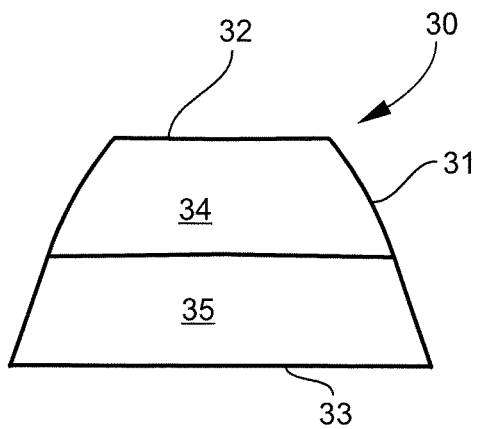
FIGS. 5A and 5B illustrate geometry and features of a light extraction element according to some embodiments.
Figure 5B:
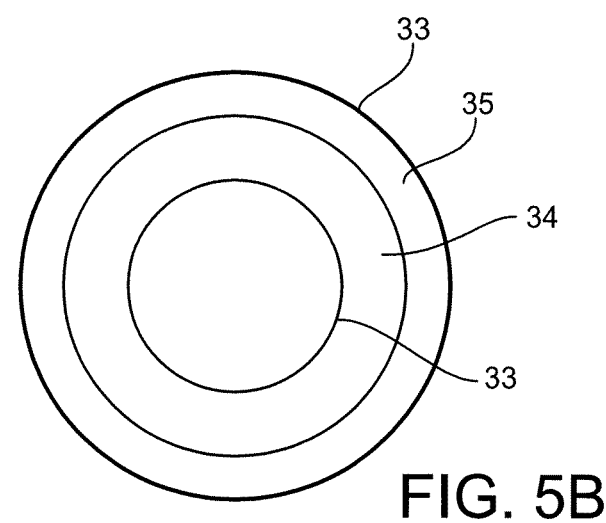

Light extraction elements are bonded to the waveguide body. Light extraction elements may be bonded to one or more surfaces of the waveguide body. For example, light extraction elements can be bonded to one or both faces of the waveguide body. The size, shape and/or density of individual light extraction elements can be uniform or vary across one or more surfaces of the waveguide body in a regular or irregular fashion to produce desired light distribution in conjunction with the light sources. Light extraction elements bonded to the waveguide body can have any desired shape. In some embodiments, light extraction elements can be protrusions, bumps, depressions or various combinations thereof. Light extraction elements have symmetrical shape or geometry. For example, individual light extraction elements can have a hemispherical profile or polygonal profile. Another geometry particularly useful for a range of lighting applications includes a roughly "bullet shaped" profile as illustrated in FIGS. 3A-3C, consisting of a truncated curved surface 21, such as a truncated hemisphere with an adjacent cylindrical or conical base 22. If desired, a bonding feature 24 having a central planar portion 23 may be formed atop the truncated hemispherical portion 21. In some embodiments, the bonding feature 24 facilitates fabrication by enabling the bond between the extraction element 20 and the waveguide surfaces to be free of air pocket(s) that may otherwise form This particular geometry provides a high degree of directionality as well as a range of possible illuminance distributions that may be realized by changing the height at which the curved surface is truncated. The height B of the hemispherical portion 21 affects the distribution of the light illumination of the waveguide 11 while the height C of the base 22 affects the percentage of light emitted downwardly relative to upward emitted light. With reference to FIG. 3B, the light extraction element 20, in one embodiment, can have dimensions listed in Table I.

TABLE I

| Light Extraction Element Dimensions | |
| --- | --- |
| A | 0.025 mm |
| B | 0.415 mm |

TABLE I-continued

| Light Extraction Element Dimensions | |
| --- | --- |
| C | 0.085 mm |
| D | 1.0 mm |
| E | 0.050 mm |
| F | 0.510 mm radius of curvature |
| G | 89 degrees |

Additional embodiments of light extraction elements 30 are illustrated in FIGS. 4A, 4B, 5A, and 5B. Each extraction feature 30 includes a body 31 having a curved shape that extends between an aperture 32 adjacent a surface of the waveguide body and a base 33 opposite the aperture 32. The aperture 32 and the base 33 may be parallel or disposed at an angle relative to one another, as may be desired for a specialized asymmetric distribution. The body 31 may include planar surfaces, curved surfaces, planar surfaces approximating one or more curved surfaces, or a combination thereof. The cross sectional outer profile of the body 31 may be symmetric in nature (e.g., as in the case of a hemisphere) or asymmetric (e.g., as in the case of an ellipse or other combination of shapes when viewed from above or below). The body 31 may include a first portion 34 adjacent the aperture 32 and a second portion 35 adjacent the base 33. In some embodiments, the first portion 34 may be designed to redirect incident light downward through total internal reflection (TIR). In some embodiments, shape of the extraction feature 30 may be determined by iteratively plotting the points defining an outer surface of the shape using a differential or quasi-differential equation.

Figure 6:
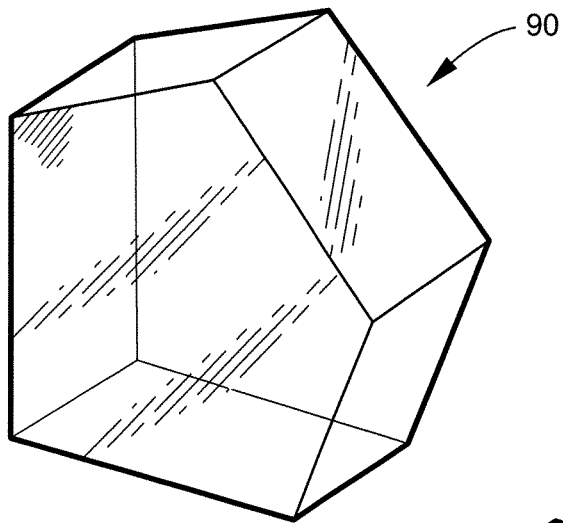
FIGS. 6-8 are perspective views of prismatic shaped light extraction elements according to some embodiments.
Figure 7:
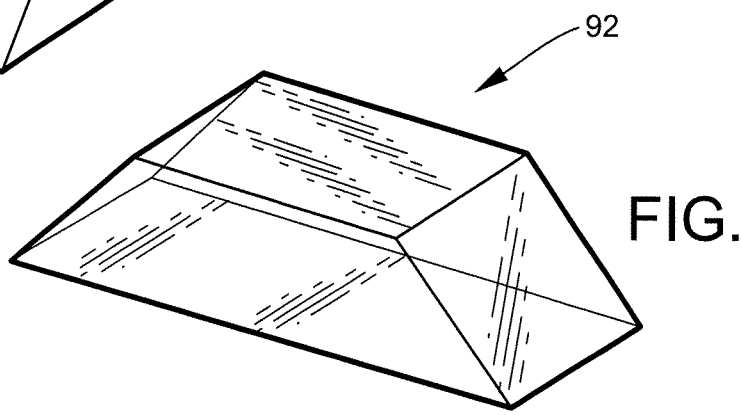
Figure 8:
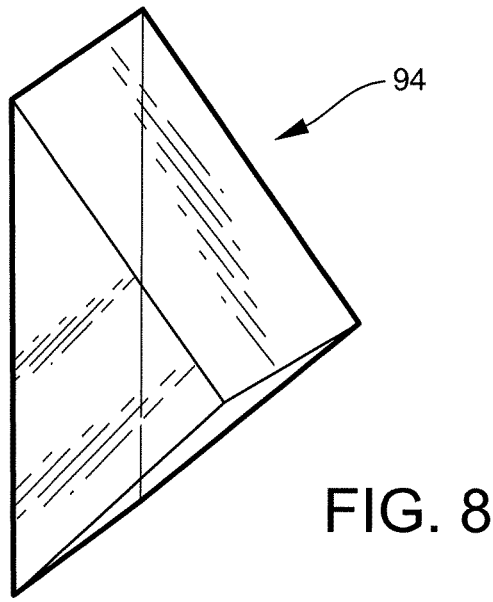

FIGS. 6-8 illustrate alternative shaped light extraction elements. The light extraction elements in FIGS. 6-8 have prismatic shapes providing for alternative undercut geometries for light extraction. In particular, a penta prism shape 90 is shown in FIG. 6, a dove prism shape 92 is shown in FIG. 7 and a porro prism shape 94 is shown in FIG. 8. Various arrangements and combinations of truncated curved and prismatic shaped light extraction elements may be selectively employed.

Figure 9:
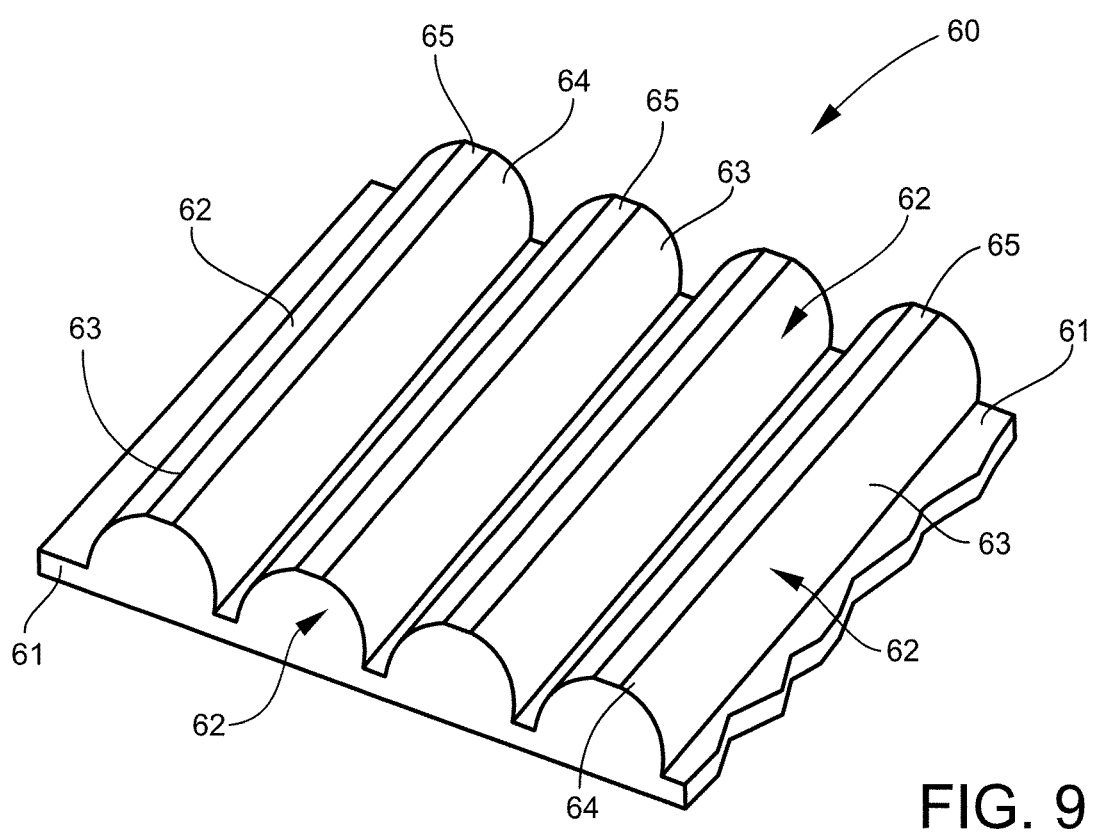
FIG. 9 is a fragmentary perspective view a light extractor plate of a waveguide assembly comprising parallel protrusions of light extraction elements according to some embodiments.

As described herein, light extraction elements can be part of a light extractor plate. The light extraction elements, for example, can be arranged on a substrate or base. The substrate may be a planar member such as a film, a plate, a block of material or the like. Referring to FIG. 9, another example of an extractor plate 60 includes a base 61 and undercut light extraction elements 62 disposed on the base 61. In this embodiment, the light extraction elements 62 form a series of elongate parallel protrusions 63 extending from the base 61. The elongate parallel protrusions 63 of the light extraction elements 62 seen in the embodiment of FIG. 9 may have a hemispherical cross section shape. A top portion 64 of the light extraction elements 62 may have a generally flattened surface 65 to provide a truncated hemispherical shape of the light extraction elements 62 extending from the base 61.

Figure 10:
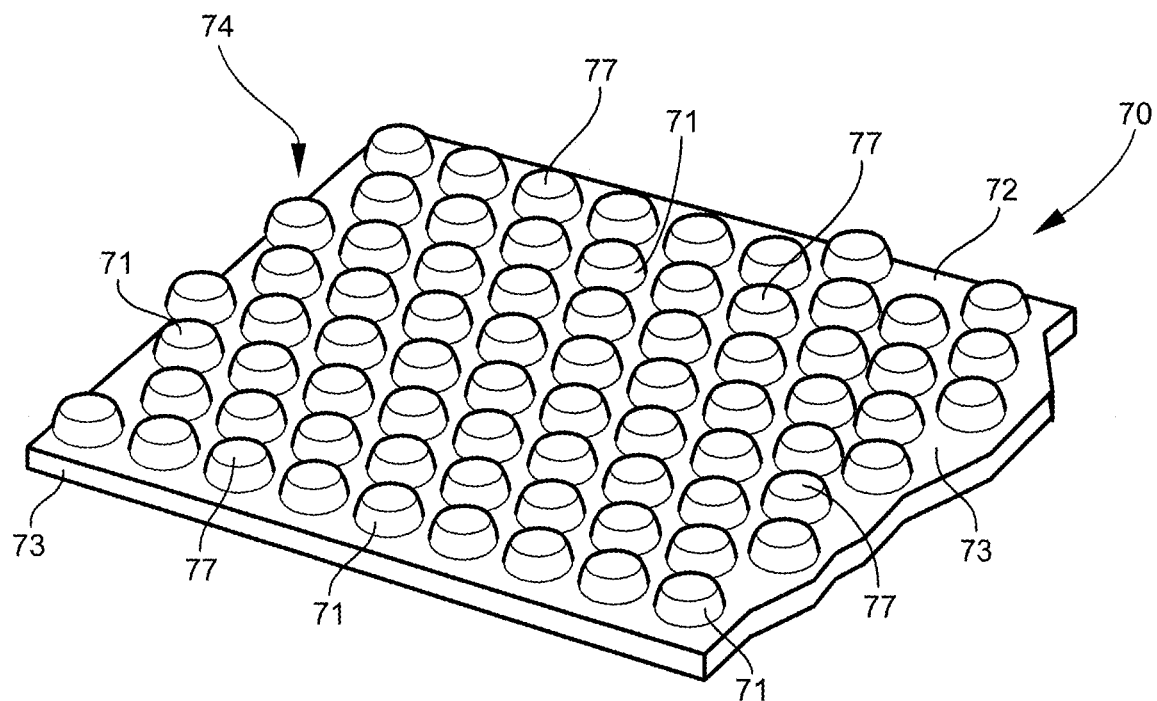
FIG. 10 is a fragmentary perspective view of a light extractor plate of a waveguide assembly comprising an array of light extraction elements on a substrate or film according to some embodiments.
Figure 11:
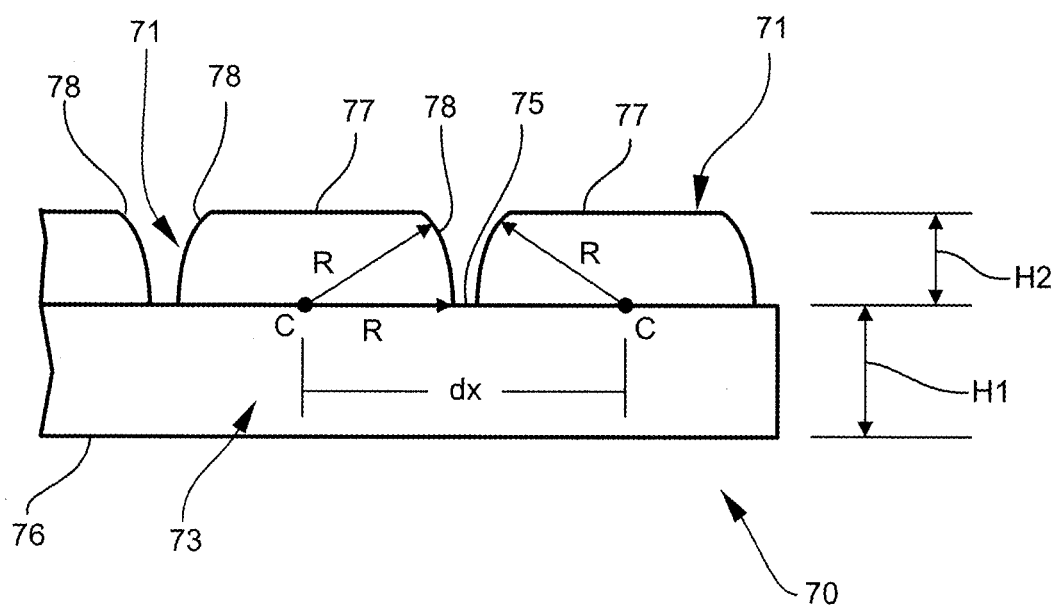
FIG. 11 is a fragmentary elevational view of an extractor plate comprising a substrate and light extraction elements according to some embodiments.

FIGS. 10 and 11 illustrate another embodiment of an extractor plate 70 in which light extraction elements 71 are disposed in a regular pattern atop a surface 72 of the base 73. In this illustrated example, the extractor plate 70 comprises an array 74 of regularly-spaced light extraction elements 71, although it should be noted that the light extraction elements may be irregularly spaced or some may be regularly spaced and others irregularly spaced, etc. Further, the geometry and size of the light extraction elements 71 may vary across the film 70 in either a regular or irregular fashion. In this example, the optically transmissive extractor plate 70 may be formed with the light extraction elements 71 disposed in a hexagonal array 74 on the top surface 72 of the base 73. The undercut light extraction elements 71 are of substantially the same size and have substantially the same shape across the surface of the base 73 in this embodiment. The undercut light extraction elements 71 arranged in the hexagonal array 74, in this example, have a truncated hemispherical shape. The light extraction elements 71 may have other shape(s) necessary to produce a desired light distribution. The light extraction elements 71 may be formed using one of a variety of techniques typically applied to the formation of micro-optical films, including gray-scale lithography, micro-replication, injection/compression molding, reactive ion etching, chemical embossing during production of the optically transmissive film 70. The undercut light extraction elements 71 may be formed of any material having suitable optical properties including, but not limited to, acrylic, acrylic based resins, polycarbonate or glass.

As seen in the embodiment of FIGS. 10 and 11, the base 73 has a constant height (H1) or thickness. In alternative embodiments, however, the thickness (H1) of the base 73 may vary at different points along the base. Further, it may be desirable to fabricate varying degrees of roughness, or specific optical features, such as a second set or array of geometrical light extraction elements on the back surface 76 of the film 70 (FIG. 11) in order to further provide control over illuminance distributions. Still further, the thickness (H1) may be essentially zero (e.g., in cases where the light extraction elements 71 are fabricated directly on the waveguide surface). According to one embodiment, the thickness (H1) of the base 32 is about 1 μm to about 5 mm or more, and more preferably is between 250 μm and about 3 mm and most preferably is equal to about 500 μm. Further, as seen in the illustrated embodiment of FIGS. 10 and 11, each of the truncated light extraction elements 71 of the extractor plate 70 may have a height (H2), FIG. 11, extending from the base 73 that is substantially the same for each light extraction element. In alternative arrangements, the height (H2) of the individual light extraction elements 71 may selectively vary within the same extractor plate 70. In some embodiments, the extraction film 70 may be laminated or otherwise affixed to a surface of the waveguide body 12 such that the height (H2), FIG. 11, of the undercut light extraction elements 71 may be selectively varied to produce a wide range of illuminance distributions according to user preference.

The light extraction elements 71 extend from the top surface 72 of the base 73 to a generally flat surface 77 such that the curved shape of the light extraction member 71 is truncated by the flat surface. In this example, the truncated hemispherical light extraction elements 71 have a uniform rounded side surface 78, FIG. 11, which extends from the top surface 72 of the base 73 to the generally flat surface 77 of the light extraction element 71. As such, with the light extraction elements 71 having a uniform rounded side surface 78, each light extraction element 71 has a cross section dimension that is largest proximal the base 73 and the cross sectional dimension becomes smaller distal from the base as the rounded side surface 78 extends from the base towards the flat portion 77. The hemispherical light extraction elements 71 may have a radius (R) at a preselected length that is truncated by the flat surface 77 to a preselected height (H2). In one example, the hemispherical shaped light extraction elements 71 may have a 600 μm radius that is truncated to a height that may range, for example, between 100-590 μm. Of course, other radial lengths and truncated heights may selectively be employed. Still further, the minimum distances between adjacent light extraction elements 71 may selectively depend on the radius (R) of the light extraction element and the limitations of the film fabrication method employed, with an example minimum distance being twice the radius (2×(R)) or greater. In other examples, values less than twice the radius (2×(R)) may be used where overlapping of the extraction elements is desired for optical reasons (e.g., to improve extraction efficiency).

In the embodiment of FIG. 11, the distances (dx) between the center points (C) of adjacent extraction elements 71 may be consistent throughout the array. The center-to-center spacing (dx) of the protruding light extraction elements 71 may selectively have a value of about twice the radius (2×(R)) in regions where a high level of extraction (and hence a luminance approaching the maximum possible light output for that region) is desired with the bases of the extraction elements just in contact. In regions where reduced luminance are desired, values greater than twice the radius (2×R)) can be used.

Figure 12:
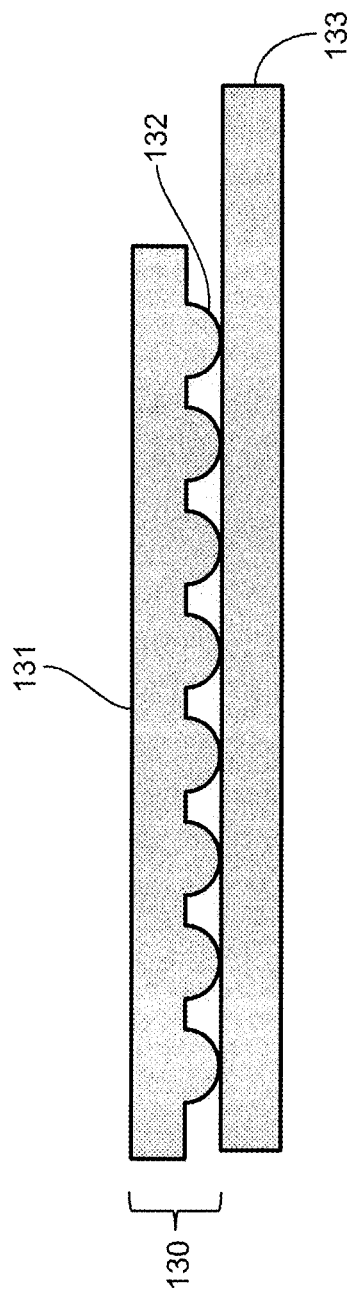
FIG. 12 illustrates an extractor plate bonded to a waveguide body according to some embodiments described herein.
Figure 13:
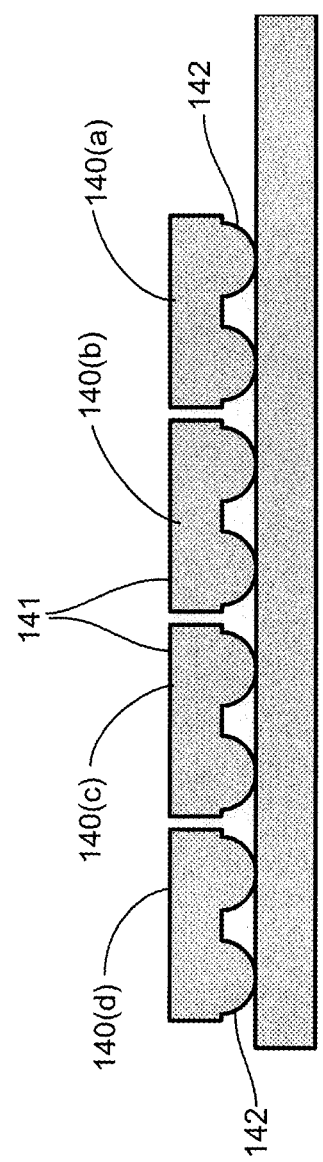
FIG. 13 illustrates multiple extractor plates bonded to a light emitting surface of a waveguide body according to some embodiments.

FIG. 12 illustrates an extractor plate bonded to a waveguide body according to some embodiments described herein. As illustrated in the FIG. 12, the extraction elements 132 are associated with a substrate or base 131 of the extractor plate 130. The extractor plate 130 is bonded to a light emitting surface of the waveguide body 133 via the extraction elements 132. The light extraction elements 132 may be bonded to the waveguide body either directly or with one or more intermediate layers using a variety of bonding methods including ultrasonic bonding, laser bonding, adhesive bonding, pressure-sensitive adhesive bonding, chemical welding, thermal bonding or combinations thereof. In some embodiments, multiple extractor plates may be bonded to a light emitting surface of the waveguide body. For example, the desired number of extraction elements may be divided over multiple extractor plates. Use of multiple extractor plates can assist with inhibiting and/or arresting de-bonding mechanisms described herein. FIG. 13 illustrates multiple extractor plates bonded to a light emitting surface of a waveguide body according to some embodiments. As illustrated in FIG. 13, the extraction elements 142 are spread over several extractor plates 140(*a*)-(*d*). By lacking a common substrate or base 141, tensile and/or shear stresses experienced at one extractor plate, 140(*a*) for example, are not transmitted to extraction elements 142 of the remaining plates 140(*b*)-(*d*). Therefore, de-bonding and other failure modes can be localized and effectively managed across the entire waveguide assembly.

As described herein, extraction elements may alternatively be disposed on the waveguide body without a base or substrate. For example, the extraction elements may be fabricated directly on surfaces of the waveguide body 12 by means of an intermediate patterning layer as described in U.S. Pat. No. 8,564,004, issued Oct. 22, 2013, entitled "Complex Primary Optics with Intermediate Elements" by Tarsa et al., incorporated by reference herein. Using this method of manufacture, the extraction elements are optically joined to the waveguide body without the need for the base. The patterning layer may be used with any method such as molding, injection molding, compression molding, dispensing, stencil printing, three-dimensional printing, photolithography, deposition, or the like. Specifically, the patterning layer is formed on surface(s) of the waveguide body and includes holes or openings where the waveguide body is exposed. The openings of the patterning layer correspond to locations where the extraction elements are to be formed on the waveguide body. In some embodiments, a mold is then placed over the patterning layer and surface(s) of the waveguide body. The mold includes voids that are aligned with the openings of the patterning layer to define cavities. The cavities are filled with the material of the extraction elements. In other embodiments, the material of the extraction elements is applied to the openings of the patterning layer prior to placement of the mold on the patterning layer. In either case, the material of the extraction feature is then at least partially cured and the mold is removed. The material of the patterning layer may comprise polyvinyl alcohol, a poly(methyl methacrylate) (PMMA) one or more photoresist materials, or other suitable materials. The patterning layer may be removed by a water rinse, heat, vaporization, machining, developers and solvents, chemical etching/solvent, plasma etching, or any method that does not interfere with the material of the waveguide body and/or extraction elements. In further embodiments, the extraction elements are fabricated independent of the waveguide body and subsequently picked and placed in the desired location of the waveguide body. Extraction elements of any size and shape can be independently fabricated and subsequently placed in an array or random position on the waveguide body.

Alternatively, the waveguide body, the extraction elements and/or the base may be bonded to one another through one or more supplemental layers such as an adhesive layer or pressure-sensitive adhesive film. Additional extraction element and extractor plate architectures are described in U.S. patent application Ser. No. 14/472,078 entitled "Waveguide Having Unidirectional Illuminance" by Tarsa et al., U.S. patent application Ser. No. 14/472,035 entitled "Luminaires Utilizing Edge Coupling" by Tarsa et al. and U.S. patent application Ser. No. 14/472,064 entitled "Luminaire with Selectable Luminous Intensity Pattern", each of which is incorporated herein by reference in its entirety.

As described herein at least one reinforcement element is coupled to the waveguide assembly at one or more locations to reduce deflection of the waveguide assembly under an applied flexural load. It is preferable that reinforcement elements do not materially alter the lighting characteristics and/or performance of the waveguide assembly. Reinforcement elements can be of any structure operable to reduce deflection of the waveguide assembly while under an applied flexural load. In some embodiments, a reinforcement member comprises one or more bars or rods coupled to the waveguide assembly. A reinforcement bar can be of any length and shape. A reinforcement bar, for example, can be linear, curved or various combinations thereof. In some embodiments, a reinforcement bar has an accordion or zig-zag form. A reinforcement bar can also have a coiled or serpentine form or arrangement. Moreover, a reinforcement bar can have any cross-sectional profile. A reinforcement bar can have a polygonal, circular or elliptical cross-sectional profile, in some embodiments. Additionally, the cross-sectional profile of a reinforcement bar can be tailored to minimize contact with the waveguide assembly while providing sufficient strength for reducing deflection of the waveguide assembly under an applied load. The reinforcement bar, for example, can be thinner at the base for minimizing contact with an optical surface, such as the waveguide body, and expand in the vertical dimension. In some embodiments, height of a reinforcement bar changes along length of the bar. A reinforcement bar can have increased height at locations of the waveguide assembly experiencing high tensile and/or shear stresses and decreased height at other locations. Reinforcement bars or rods can be independent of one another or can be connected in any manner including but not limited to, end to end, overlapping or stacked.

A reinforcement member can also be a frame. In some embodiments, a frame comprises two or more reinforcement members connected to one another. For example, two or more reinforcement bars or rods can be connected to form a frame. As detailed further herein, a frame can have any shape including polygonal, circular, elliptical or various combinations thereof. In some embodiments, frame shape generally matches the shape of the waveguide body or extractor plate. A frame can be closed in that sides of the frame are connected to define a closed interior region of the frame. Alternatively, a frame can be open in that the sides of the frame do not define a closed interior region. Additionally, sides of a frame can be the same or substantially the same. In other embodiments, two or more sides of a frame can be different from one another in at least one property or design. Sides of a frame, for example, can be of different materials, shapes and/or dimensions. In some embodiments, one or more sides of a frame are polymeric material while other frame sides are metal or alloy, such as steel. Height and/or cross-sectional geometry of frame sides may also vary. The construction and design of an individual side of a frame can be tailored according to the stress environment experienced by the side. Sides of a frame experiencing high shear and/or tensile stresses transmitted by the waveguide assembly can be fabricated from more rigid materials and/or have different cross-sectional profile in comparison to frame sides in a lower stress field. Moreover, construction and design of a frame side can also be dependent on the optical properties and performance of the waveguide assembly. Frame sides can be designed to minimize optical disruptions while providing sufficient resistance to deflection. In some embodiments, a single frame is used to enhance structural rigidity of the waveguide assembly. In other embodiments, multiple frames may be employed. Multiple frames, for example, may be coupled to the waveguide body at one or more locations. In some embodiments, multiple frames are stacked upon one another. Multiple frames can also have concentric or eccentric orientation relative to one another. Additionally, several components of the waveguide assembly can have a frame coupled thereto. In some embodiments, a first frame is coupled the waveguide body and a second frame is coupled to an extractor plate. In other embodiments, a frame is employed to couple components of the waveguide assembly. For example, a frame can exhibit a clamping arrangement for coupling the waveguide body and extractor plate together.

In further embodiments, a reinforcement member is an adhesive bonding one or more components of the waveguide assembly to increase rigidity of the assembly. As detailed further herein, an adhesive can be employed to bond one or more edges of an extractor plate to the waveguide body. An adhesive, for example, can be positioned on the base of an extractor plate outside the bonding region defined by the light extraction elements bonded to a light emitting surface of the waveguide body. The adhesive may be placed between one or more edges of the extractor plate and waveguide body. The adhesive can increase bonding between the extractor plate and waveguide body, thereby increasing resistance to de-bonding and other failure mechanisms.

Figure 14A:
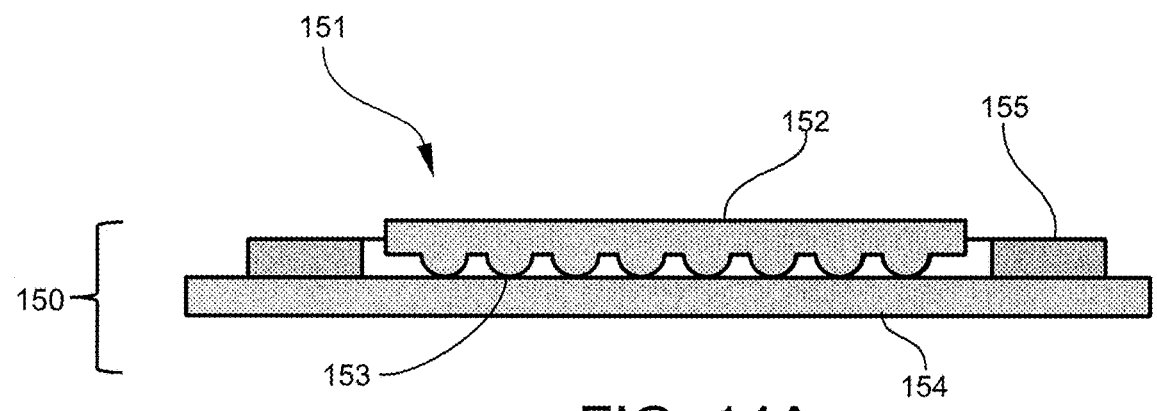
FIG. 14A illustrates a cross-sectional view of a reinforcing frame surrounding a light emission region of a waveguide assembly according to some embodiments.
Figure 14B:
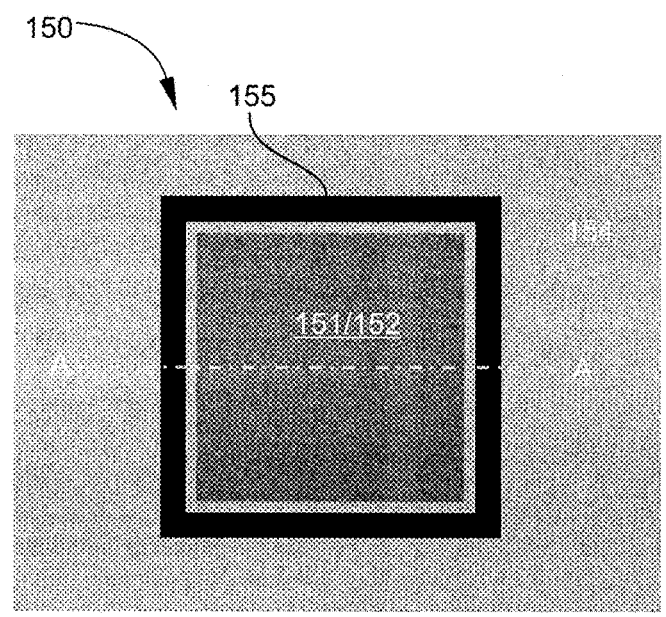
FIG. 14B illustrates a top plan view of a reinforcing frame coupled to the waveguide assembly according to some embodiments.
Figure 14C:
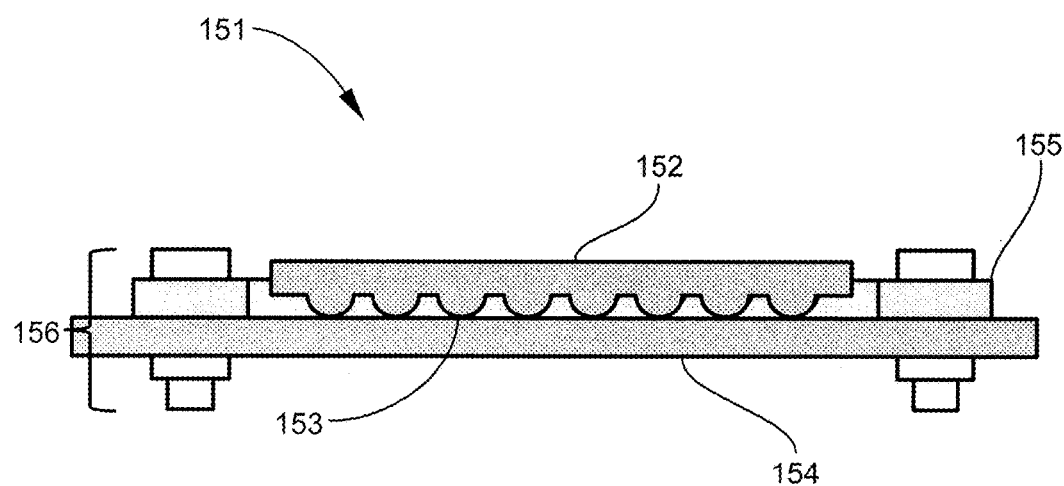
FIG. 14C illustrates a screw or bolt assembly coupling the reinforcing plate to the waveguide body according to some embodiments.

Location(s) of the one or more reinforcement elements can be determined according to several factors including, but not limited to, the construction and arrangement of the light extraction elements, desired optical properties and lighting performance characteristics of the waveguide assembly and load transmission properties of the waveguide assembly. For example, one or more reinforcement members can be coupled to the waveguide assembly outside light emitting regions. Moreover, one or more reinforcement members can be placed at locations of the waveguide assembly where generation and/or transmission of tensile and/or shear stresses is the greatest. In some embodiments, light extraction elements define a light emission region and a reinforcement member is coupled to the waveguide assembly outside the light emission region. One or more bars can be coupled to the waveguide body outside the light emission region. Alternatively, a frame can be coupled to the waveguide body outside the light emission region. In some embodiments, the frame can surround the light emission region defined by the light extraction elements. FIG. 14A illustrates a cross-sectional view of a reinforcing frame surrounding a light emission region of a waveguide assembly according to some embodiments described herein. The cross-sectional view is taken along the A-A line of FIG. 14B. The light emission region 151 of the waveguide assembly 150 is defined by an extractor plate 152 bonded to the waveguide body 154 via extraction elements 153. The reinforcing frame 155 is coupled to the waveguide body 154 and surrounds the extractor plate 152. FIG. 14B illustrates a top plan view of the reinforcing frame 155 coupled to the waveguide assembly 150. In being coupled to the waveguide body 154 outside the light emission region 151 defined by the extractor plate 152, the reinforcing frame 155 does not materially interfere with the optical properties and lighting performance of the waveguide assembly 150. The reinforcing frame 155 can be coupled to the waveguide body 154 by a variety of non-limiting mechanisms. In some embodiments, adhesive is used to couple the reinforcing frame 155 to the waveguide body 154. In other embodiments, the reinforcing frame 155 is coupled to the waveguide body 154 by one or more mechanical fasteners. Any mechanical fastener not inconsistent with the objectives of the present invention may be employed. In some embodiments, a mechanical fastener comprises a screw or bolt assembly. In other embodiments, a mechanical fastener can include one or more clips. FIG. 14C illustrates a screw or bolt assembly 156 coupling the reinforcing frame 155 to the waveguide body 154 according to one embodiment.

Figure 15:
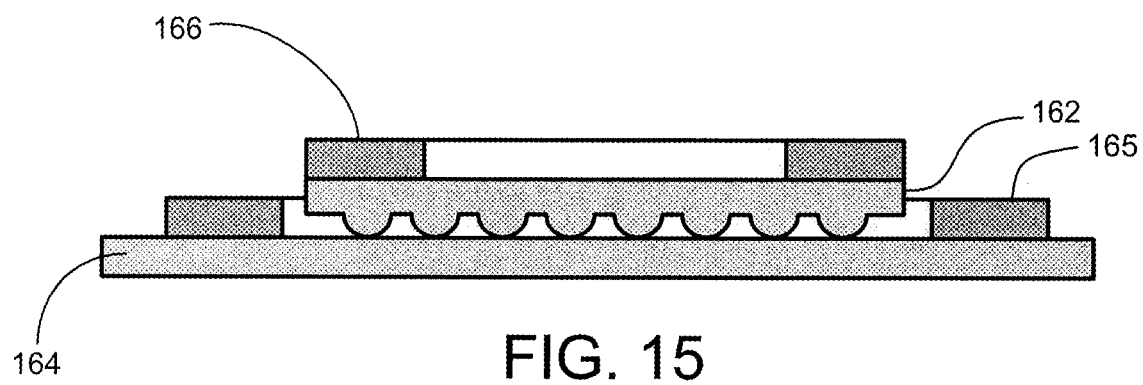
FIG. 15 illustrates reinforcing frames coupled to the extractor plate and waveguide assembly according to some embodiments described herein.
Figure 16:
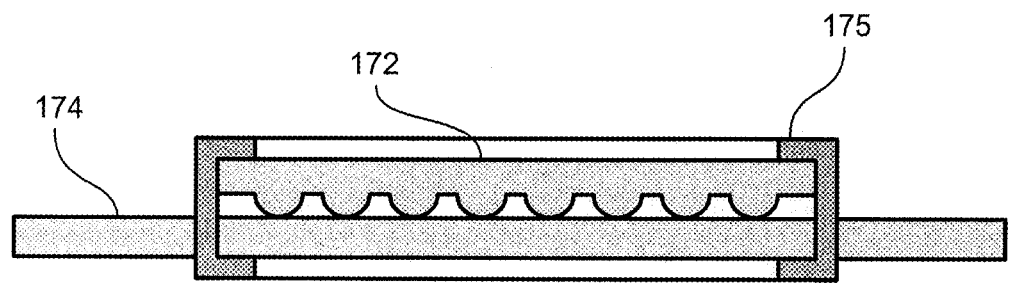
FIG. 16 illustrates a clamping frame coupled to a waveguide assembly according to some embodiments described herein.

As described herein, a plurality of reinforcing members can be coupled to the waveguide assembly to reduce deflection of the waveguide assembly under an applied flexural load. In the embodiment of FIG. 15, for example, a first reinforcing frame 165 is coupled to the waveguide body 164 and a second reinforcing frame 166 is coupled to the extractor plate 162. In other embodiments, multiple frames can be coupled to the waveguide body. In some embodiments employing multiple frames, the frames can have a concentric arrangement or eccentric arrangement. Additionally, a single frame may couple to the waveguide body and extractor plate. FIG. 16 illustrates an arrangement wherein a clamping frame 175 is coupled to the waveguide body 174 and extractor plate 172.

As described herein a frame can couple to the waveguide body and/or extractor plate via adhesive and/or mechanical fastener(s). In some embodiments, the entire bottom surface of the frame engages the waveguide body directly or through an adhesive. Alternatively, coupling is accomplished through several discrete contact points between the frame and waveguide body. In some embodiments, the frame is coupled to the waveguide body at one or more vertices of the frame. In other embodiments, the frame is coupled to the waveguide body at one or more discrete points along side(s) of the frame. Coupling via discrete contact points minimizes contact between the frame and waveguide body. Minimization of this contact can preclude optical disruptions and losses precipitated by light propagating in the waveguide body interacting at interfaces of the frame and waveguide body. In some embodiments, one or more spacers are positioned at coupling locations between the frame and waveguide body. The spacers lift the frame off the waveguide surface, thereby minimizing optical disruptions. Spacing the frame from the surface of the waveguide body can minimize or preclude undesirable optical coupling events and/or prevent scratching of the waveguide surface by the frame. Scratches in the waveguide surface can precipitate optical losses and undesirable alterations to the lighting distribution of the waveguide assembly. Spacers can also be employed with any reinforcement member, such as bars or rods described herein, to minimize surface contact between the reinforcement member and waveguide body. Spacers may additionally be used in a similar manner with reinforcement members coupled to an extractor plate. In some embodiments, optical efficiency of the waveguide assembly is reduced less than 5 percent by the one or more reinforcement members.

Figure 17:
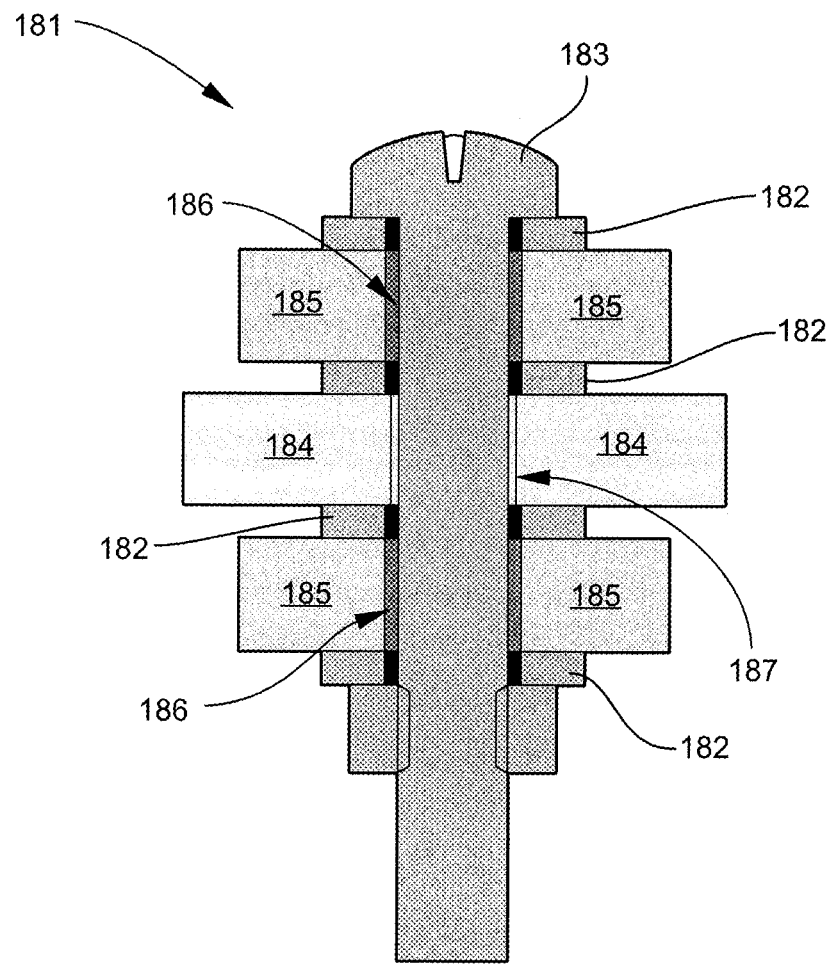
FIG. 17 illustrates mechanical coupling of reinforcement elements to a waveguide body according some embodiments.

Reinforcement members can be formed of materials different than components of the waveguide assembly to which the reinforcement members are coupled. In some embodiments, a reinforcing bar, rod or frame is a metal or alloy, such as aluminum or steel, while the waveguide body and/or extractor plate comprises polymeric material. When the reinforcement member is formed of a different material than waveguide assembly component(s), various measures can be employed to address mismatches in coefficients of thermal expansion (CTE) between the reinforcement member and waveguide assembly component(s). As described above, one or more spacers are positioned between the reinforcement member and waveguide body. The spacer can raise the reinforcement member above the surface of the waveguide body, thereby minimizing contact between the reinforcement member and waveguide body. The spacer can also be formed of a material bridging the CTE mismatch between the reinforcement member and waveguide body. Additionally, apertures of varying diameter can be used to address CTE mismatch between the reinforcing member and waveguide body. FIG. 17 is a cross-sectional view of mechanical coupling of reinforcement elements to a waveguide body according some embodiments. As provided in FIG. 18, a screw or bolt assembly 181 couples the reinforcement elements 185 to the waveguide body 184. The screw or bolt assembly 181 comprises washers 182 in addition to the screw or bolt 183. The reinforcement elements 185 may be individual bars or frames. In some embodiments, the reinforcing elements 185 are sides of a clamping frame. In the embodiment of FIG. 17, the reinforcing elements 185 are formed of structural steel or aluminum, and the waveguide body 184 is formed of polymethylmethacrylate (PMMA). CTEs for these materials are provided in Table II.

TABLE II

| CTE (ppm/° C.) | |
|---|---|
| Material | CTE |
| PMMA | 70 |
| Aluminum | 22 |
| Structural Steel | 13 |

This CTE mismatch can cause binding of the screw or bolt 183 in response to temperature fluctuations. This binding can deflect the reinforcement members 185 resulting in flexure and application of detrimental stresses to the waveguide body 184. To address this, apertures 186 in the reinforcement members 185 and waveguide body 184 are provided diameters permitting independent expansion and/or contraction movements between reinforcing members 185 and waveguide body 184. In the embodiment of FIG. 17, apertures 186 of the reinforcement members 185 are larger in diameter than the aperture 187 in the waveguide body. However, other aperture diameter arrangements are possible depending on material systems employed and design of the coupling arrangement. In some embodiments, for example, aperture of the waveguide is larger than an aperture in one or more reinforcing members. Additionally, aperture shape may be varied between the reinforcing member(s) and waveguide body to address CTE differences.

Figure 18:
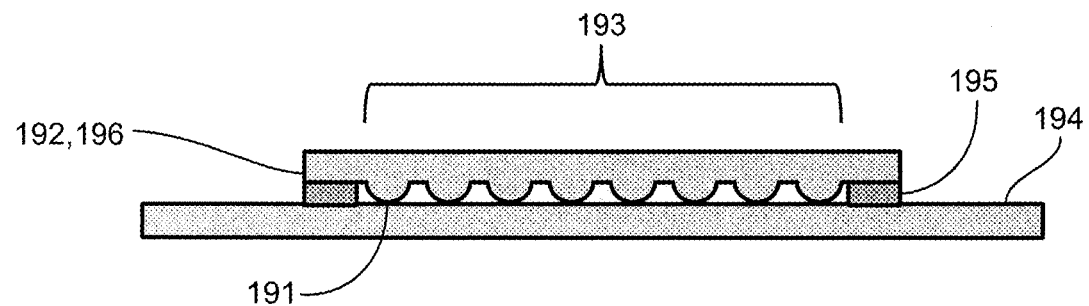
FIG. 18 illustrates application of an adhesive between an extractor plate and waveguide body according to some embodiments.

In some embodiments, problems with CTE mismatch are obviated by use of adhesive reinforcing member(s). FIG. 18 illustrates application of an adhesive between an extractor plate and waveguide body according to some embodiments. In the embodiment of FIG. 18, the extraction elements 191 of the extractor plate 192 define a bonding region 193 between the extractor plate 192 and waveguide body 194. An adhesive reinforcement member 195 is positioned outside the bonding region 193 to further couple the extractor plate 192 to the waveguide body 194. In the embodiment of FIG. 18, the adhesive reinforcement member 195 is applied along one or more edges 196 of the extractor plate 192. The adhesive reinforcement element 195 can be a polymeric material having CTE matching or similar to the polymeric materials forming the waveguide body 194 and extractor plate 192. In some embodiments, an acrylic adhesive is employed for acrylic waveguide bodies and extractor plates.

As described herein, one or more reinforcement members coupled to the waveguide assembly can preclude de-bonding of the light extraction elements under the applied flexural load. In some embodiments, the applied flexural load is sufficient to de-bond light extraction elements in the absence of the reinforcement member(s). For example, the applied flexural load can be at least 20 pounds. In some embodiments, the applied flexural load is selected from Table III.

TABLE III

Flexural Load Applied to Waveguide Assembly

| Flexural Load (lbs) |
| --- |
| ≥30 |
| ≥60 |
| 30-150 |
| 40-120 |
| 50-100 |
| 60-90 |

Figure 19:
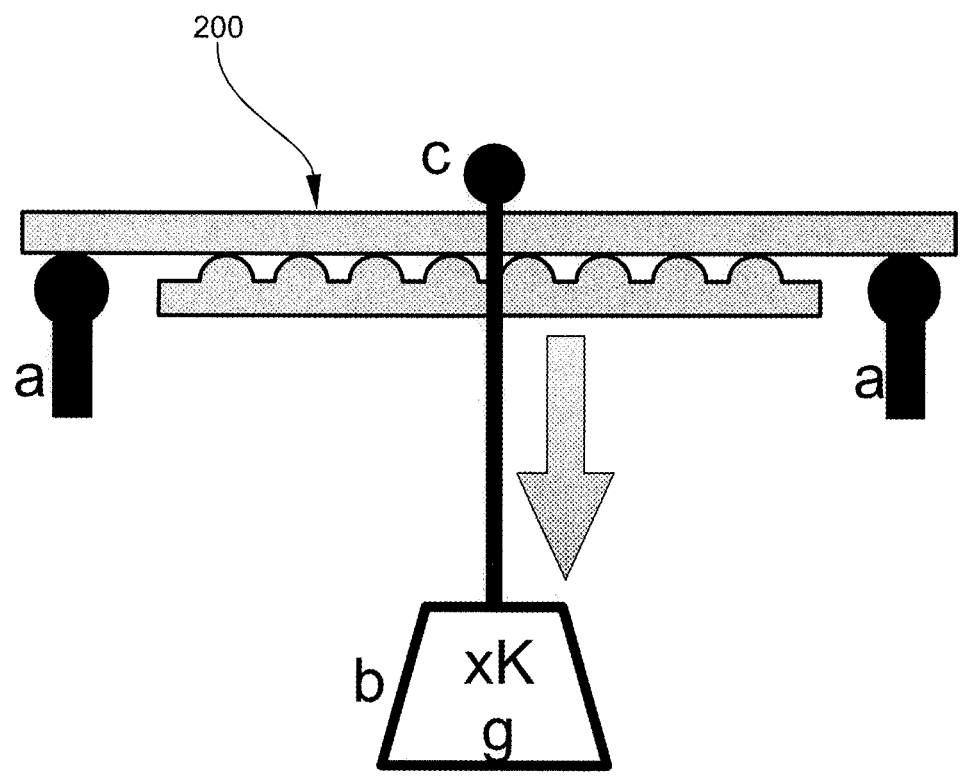
FIG. 19 illustrates a three-point bend apparatus employed to evaluate reinforced waveguide assemblies described herein.

For purposes of evaluating waveguide assemblies and associated reinforcement member(s) described herein, flexural loads are applied according to the three-point bend apparatus illustrated in FIG. 19. The waveguide assembly 200 including any reinforcement members (not shown) is suspended between two linear supports (a) with the light emitting surface comprising bonded extraction elements facing down. Incremental weight (b) is added to a bar (c) positioned on top of the waveguide 200 at the center until de-bonding of one or more extraction elements occurs. The de-bonding may be partial or full de-bonding of an extractor element from the waveguide surface.

In some embodiments, a waveguide assembly having at least one reinforcement member coupled thereto does not exhibit de-bonding of one or more extraction elements at flexural loads provided in Table III. In one embodiment, for example, a waveguide assembly having at least one reinforcement member coupled thereto does not exhibit de-bonding of one or more extraction elements at an applied flexural load of 15-50 pounds. Additionally, in some embodiments, a waveguide assembly having at least one reinforcement member coupled thereto does not exhibit deflection greater than 10 mm at applied flexural loads provided in Table III. Reinforced waveguide assemblies described herein, in some embodiments, exhibit less than 5 mm deflection at applied flexural loads of 15-50 pounds or 20-45 pounds.

Any light sources not inconsistent with the objectives of the present invention can be employed with waveguide assemblies having one or more reinforcement members coupled thereto. Fluorescent and/or LED light sources, for example, can be used in the luminaire construction. LED light sources may comprise packaged LED chip(s) or unpackaged LED chip(s). LED elements or modules can use LEDs of the same or different types and/or configurations. The LEDs can comprise single or multiple phosphor-converted white and/or color LEDs, and/or bare LED chip(s) mounted separately or together on a single substrate or package that comprises, for example, at least one phosphor-coated LED chip either alone or in combination with at least one color LED chip, such as a green LED, a yellow LED, a red LED, etc. The LED module can comprise phosphor-converted white or color LED chips and/or bare LED chips of the same or different colors mounted directly on a printed circuit board (e.g., chip on board) and/or packaged phosphor-converted white or color LEDs mounted on the printed circuit board, such as a metal core printed circuit board or FR4 board. In some embodiments, the LEDs can be mounted directly to a heat sink or another type of board or substrate. Depending on the embodiment, LED arrangements or lighting arrangements using remote phosphor technology can be employed as would be understood by one of ordinary skill in the art, and examples of remote phosphor technology are described in U.S. Pat. No. 7,614,759, assigned to the assignee of the present invention and hereby incorporated by reference.

In those cases where a soft white illumination with improved color rendering is to be produced, each LED element or module or a plurality of such elements or modules may include one or more blue shifted yellow LEDs and one or more red or red/orange LEDs as described in U.S. Pat. No. 7,213,940, assigned to the assignee of the present invention and hereby incorporated by reference. The LEDs may be disposed in different configurations and/or layouts along one or more edges of the waveguide body, as desired. Different color temperatures and appearances could be produced using other LED combinations of single and/or multiple LED chips packaged into discrete packages and/or directly mounted to a printed circuit board as a chip-on board arrangement. In one embodiment, the light sources can comprise any LED, for example, an XP-Q LED incorporating TrueWhite® LED technology or as disclosed in U.S. patent application Ser. No. 13/649,067, filed Oct. 10, 2012, entitled "LED Package with Multiple Element Light Source and Encapsulant Having Planar Surfaces" by Lowes et al., the disclosure of which is hereby incorporated by reference herein, as developed and manufactured by Cree, Inc., the assignee of the present application. In another embodiment, the light sources can comprise XQ-E LEDs developed by Cree, Inc.

Any of the embodiments disclosed herein incorporating LED light sources may include power or driver circuitry having a buck regulator, a boost regulator, a buck-boost regulator, a fly-back converter, a SEPIC power supply or the like and/or multiple stage power converter employing the like, and may comprise a driver circuit as disclosed in U.S. patent application Ser. No. 14/291,829, filed May 30, 2014, entitled "High Efficiency Driver Circuit with Fast Response" by Hu et al. or U.S. patent application Ser. No. 14/292,001, filed May 30, 2014, entitled "SEPIC Driver Circuit with Low Input Current Ripple" by Hu et al. incorporated by reference herein. The circuit may further be used with light control circuitry that controls color temperature of any of the embodiments disclosed herein, such as disclosed in U.S. patent application Ser. No. 14/292,286, filed May 30, 2014, entitled "Lighting Fixture Providing Variable CCT" by Pope et al. incorporated by reference herein.

In some embodiments, each LED element or module may comprise one or more LEDs disposed within a coupling cavity with an air gap being disposed between the LED element or module and a light input surface. In any of the embodiments disclosed herein each of the LED element(s) or module(s) can have different or the same light distribution, although each may have a directional emission distribution (e.g., a side emitting distribution), as necessary for coupling with the waveguide.

Figure 20:
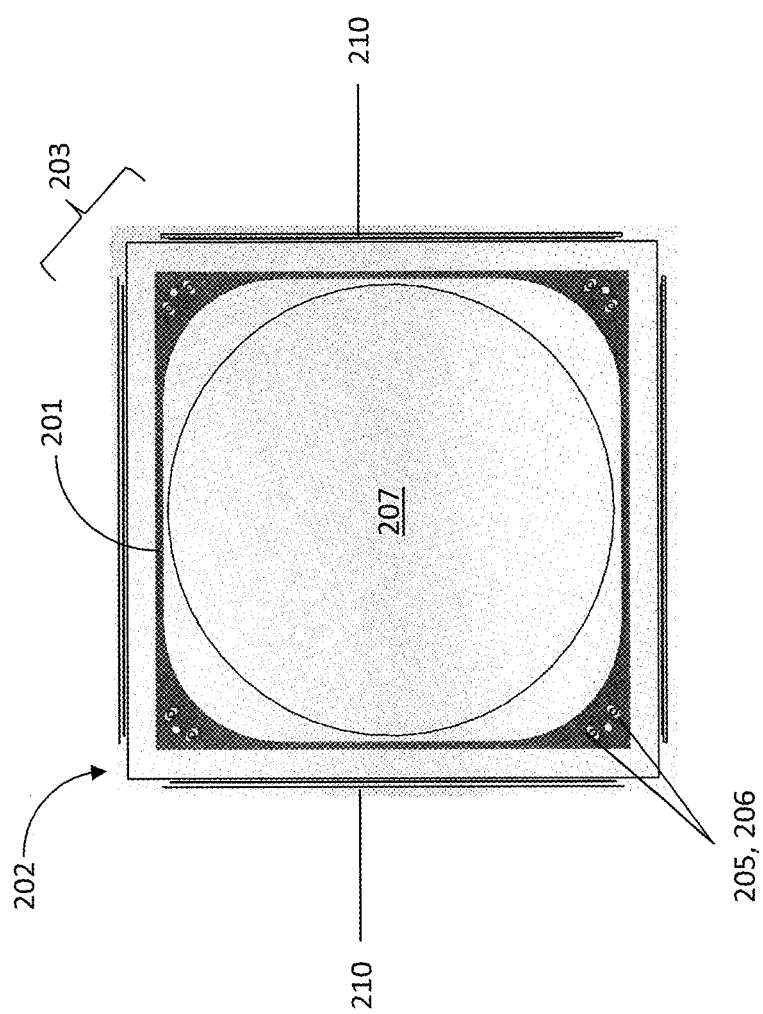
FIG. 20 illustrates a waveguide assembly comprising a reinforcing frame coupled thereto, wherein LEDs are arranged at edges of the waveguide body according to some embodiments.

FIG. 20 illustrates a waveguide assembly comprising a reinforcing frame coupled thereto, wherein LEDs are arranged at edges of the waveguide body according to some embodiments. As illustrated in FIG. 20, the reinforcing frame 201 is coupled to the waveguide assembly 202 at vertices 203 of the frame 201. Pins 205 are employed at the vertices 203 for guiding placement of the reinforcing frame 201 over the waveguide assembly 202 and coupling to a corner assembly described below. Apertures 206 in the reinforcing frame 201 for receiving the pins 205 can be oversized to inhibit or preclude binding due to thermal expansion and/or displacement of the frame 201 during assembly of the reinforced structure. The frame 201 can also be spaced from the surface of the waveguide body 207 by one or more spacers, as described herein, to minimize undesirable optical losses and/or aberrant lighting distributions resulting from coupling events and/or scratches to the light emitting surface. LED arrays 210 are arranged at edges of the waveguide body 207. In the embodiment of FIG. 20, an LED array 210 is arranged on each edge of the waveguide body 207. In other embodiments, one or more LED arrays 210 are arranged on less than all edges of the waveguide body 207.

Figure 21:
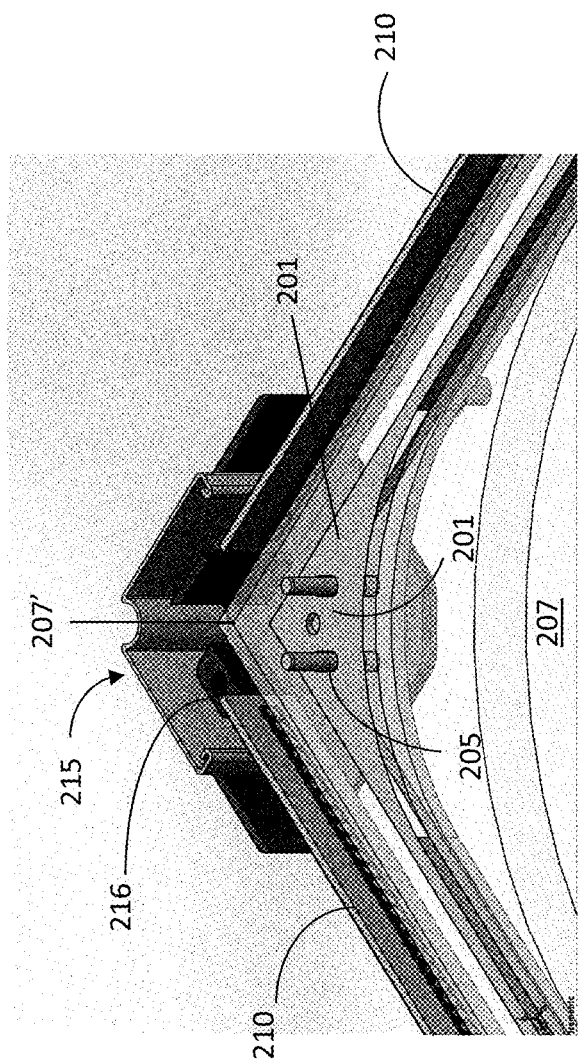
FIG. 21 illustrates a sectional view of the waveguide assembly and reinforcing frame of FIG. 20.
Figure 22:
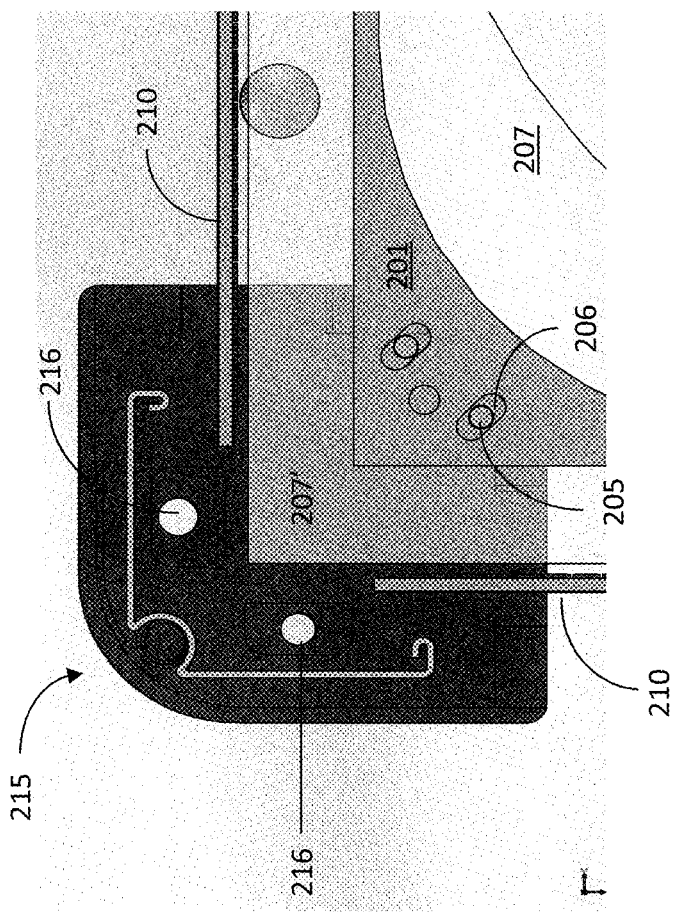
FIG. 22 illustrates a top view of the corner assembly of FIG. 21.
Figure 23:
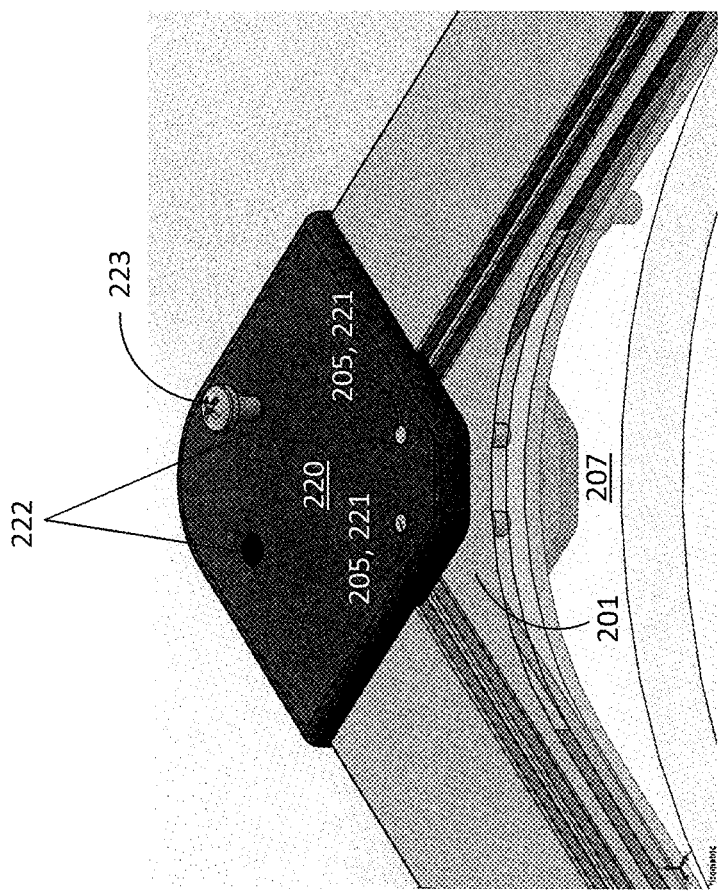
FIG. 23 illustrates the corner assembly of FIG. 22 wherein a top plate encloses the corner assembly according to some embodiments.

FIG. 21 illustrates a sectional view of the waveguide assembly and reinforcing frame of FIG. 20. Pins 205 pass through the reinforcing frame 201 and the waveguide body 207. A corner assembly 215 in an open configuration is also illustrated. A corner 207' of the waveguide body 207 inserts into the corner assembly 215. LED arrays 210 arranged along the edges of the waveguide body 207 also terminate at the corner assembly 215. The corner assembly 215 also comprises apertures 216 for receiving pins, bolts or screws to complete coupling of the reinforcing frame to the waveguide assembly in conjunction with a top plate closing the corner assembly 215. FIG. 22 is a top view of the corner assembly of FIG. 21. Apertures 216 for receiving the pins, bolts or screws are located outside the waveguide body 207, thereby precluding these structures from disrupting optical properties and lighting characteristics of the waveguide assembly 207. This can enable the use of pins, screws or bolts of larger dimension for enhanced mechanical integrity of the reinforced assembly. FIG. 23 illustrates the corner assembly of FIG. 22 wherein a top plate encloses the corner assembly. The top plate 220 comprises apertures 221 for receiving pins 205 as well as apertures 222 for receiving pins, bolts or screws 223 which terminate in apertures 216 of FIGS. 21 and 22. Once in place, the top plate 220 locks the reinforcement frame 201 into place. In the present embodiment, all four vertices of the reinforced waveguide assembly comprise corner assemblies. In other embodiments, less than all vertices can comprise corner assemblies. Moreover, similar coupling mechanisms can be applied at sides of the waveguide assembly.

Figure 24:
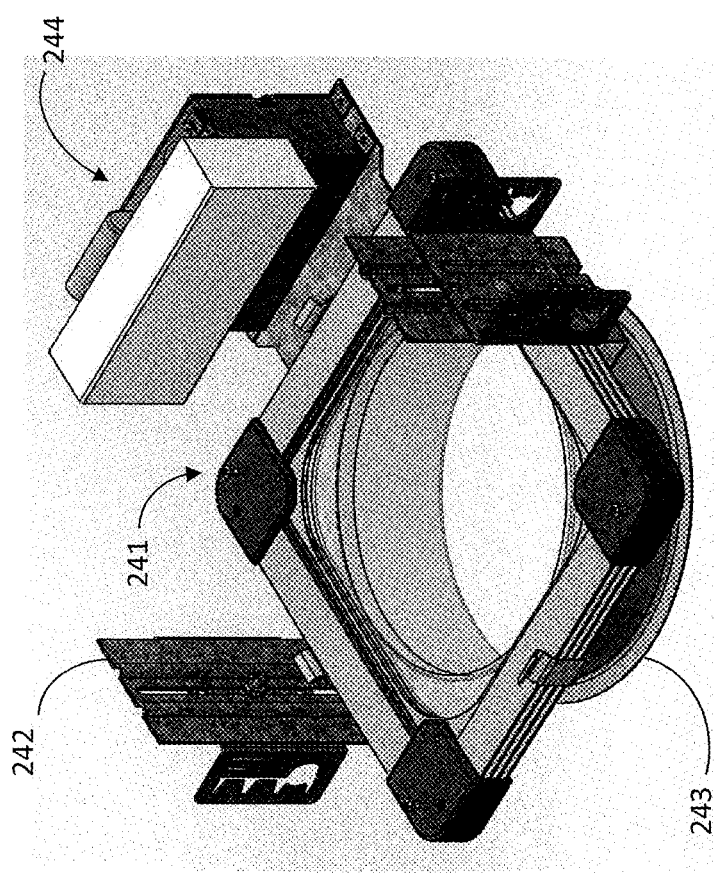
FIG. 24 illustrates integration of the reinforced waveguide assembly into a luminaire construction according to some embodiments.

FIG. 24 illustrates integration of the reinforced waveguide assembly into a luminaire construction according to some embodiments. In the embodiment of FIG. 24, the reinforced waveguide assembly 241 is coupled to a mounting frame 242. The mounting frame 242 can also accommodate one or more optical elements 243 external to the reinforced waveguide assembly 241. An external optical element 243 can be a lens or reflective surface. The mounting frame 242 may also accommodate drive circuitry and associated components 244 for the LEDs. Drive circuitry 244, for example, can comprise one or more drivers and/or current controllers for the LED arrays. Specific layout of drive circuitry and associated components can be dependent on several considerations including, but not limited to, the number and composition of the LEDs and desired lighting characteristics of the luminaire.

The forgoing reinforcement concepts are applicable to other bonded assemblies comprising surface features. An assembly, in some embodiments, comprises a plurality of discrete surface features bonded to a first plate, wherein at least one reinforcement member is coupled to the assembly at one or more locations to reduce deflection of the assembly under an applied flexural load while not altering the surface features or function of the assembly. In some embodiments, the surface features are also associated with a second plate resulting in bonding of the first plate and the second plate via the surface features. Suitable reinforcement members can include any reinforcement member described herein in relation to the bonded waveguide assemblies. In some embodiments, a reinforcement member can be a bar, rod or frame.

The surface features of the assembly define a bonding region with the first plate. In embodiments wherein a second plate is present, the surface features also establish a bonding region with the second plate. In some embodiments, one or more reinforcement members are coupled to the first plate and/or second plate outside the bonding region. For example, a reinforcement member may be coupled to the first plate and/or second plate along one or more edges of the bonding region. In some embodiments, a frame fully or partially surrounds the bonding region. A frame can have a clamping configuration coupling to the first plate and the second plate. In other embodiments, a first frame can be coupled to the first plate and a second frame coupled to the second plate. Adhesive can be applied along one or more edges of the bonding region. The adhesive can be used alone or in conjunction with another reinforcement member, such as a frame.

In some embodiments, the first plate is larger than the second plate. The first and second plates may also be different in other dimensions, such as thickness. Moreover, the first plate and the second plate can generally have the same shape. Alternatively, first and second plates can have different shapes. Surface features of the first plate can have a variety of morphologies. In some embodiments, the surface features are protrusions, indentations, ridges, channels or combinations thereof. The surface features can be arranged in one or more arrays or predetermined patterns. In other embodiments, the surface features can have a random arrangement. Bonded area between the first plate and the second plate can be less than 10 percent or less than 5 percent of surface area between the first plate and second plate. Such low bonded area can permit de-bonding under an applied flexural load in the absence of reinforcement member(s). Assemblies comprising reinforcement members described herein can be evaluated according to the three-point bend apparatus described in relation to FIG. 19.

Bonded assemblies having the foregoing constructions find application in a variety of fields. In some embodiments, a bonded assembly is a component of a microfluidic device. The microfluidic device can be continuous-flow or droplet based. For example, surface features of a first plate can define one or more fluid flow channels of the device with the second plate serving as a membrane to enclose the channels. Reinforcing member(s) can be coupled to the first and/or second plates according to embodiments described herein to prevent de-bonding or delamination of the plates in response to various stresses including, but not limited to, fluid pressure fluctuations and/or flexure of the microfluidic device. The bonded assemblies find application to various macro-fluidic devices and other pressure sensitive fluidic devices in a similar manner.

Various embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the invention.

The invention claimed is:

1. A waveguide assembly comprising:
a waveguide body and light extraction elements bonded to the waveguide body, wherein at least one reinforcement member comprises a frame contacting surfaces of the waveguide body at one or more locations along a light emitting side of the waveguide body to reduce deflection of the waveguide assembly under an applied flexural load, the at least one reinforcement member further comprising one or more frame mechanical fasteners of bolts, screws, or combinations thereof passing through the waveguide body.

2. The waveguide assembly of claim 1, wherein the light extraction elements are part of a light extractor plate.

3. The waveguide assembly of claim 2, wherein the light extraction elements define a bonding region between the extractor plate and waveguide body.

4. The waveguide assembly of claim 3, wherein the reinforcement member is coupled to the waveguide assembly along one or more edges of the bonding region.

5. The waveguide assembly of claim 2, wherein the frame contacts surfaces of the light extractor plate.

6. The waveguide assembly of claim 5, wherein the frame is a clamping frame having one side coupled to the waveguide body and opposing side coupled to the light extractor plate.

7. The waveguide assembly of claim 5, wherein shape of the light extraction elements is not altered by the reinforcement member.

8. The waveguide assembly of claim 2, wherein the waveguide body is larger than the extractor plate.

9. The waveguide assembly of claim 2, wherein the extractor plate is thinner than the waveguide body.

10. The waveguide assembly of claim 2, wherein the waveguide body is larger than the extractor plate.

11. The waveguide assembly of claim 1, wherein the light extraction elements are arranged in an array.

12. The waveguide assembly of claim 1, wherein the light extraction elements define a light emission region.

13. The waveguide assembly claim 12, wherein the reinforcement member is attached to the waveguide assembly at one or more edges of the light emission region.

14. The waveguide assembly claim 12, wherein the reinforcement member is attached to the waveguide assembly at one or more edges of the light emission region.

15. The waveguide assembly of claim 1, wherein optical efficiency of the waveguide assembly is reduced less than 5 percent by the reinforcement member.

16. The waveguide assembly of claim 1, wherein the reinforcement member precludes debonding of the light extraction elements under the applied flexural load.

17. The waveguide assembly of claim 16, wherein the applied flexural load is at least 50 pounds.

18. The waveguide assembly of claim 16, wherein the applied flexural load is sufficient to de-bond one or more of the light extraction elements from the waveguide body in absence of the reinforcement member.

19. The waveguide assembly of claim 1, wherein the frame and waveguide body comprise apertures for receiving the frame mechanical fasteners, the apertures having diameters permitting independent expansion and/or contraction movements between the frame and waveguide body.

20. The waveguide assembly of claim 19, wherein the apertures are located at vertices in the frame and the waveguide body.

21. The waveguide assembly of claim 1, wherein the frame and the waveguide body are constructed of materials having mismatched coefficients of thermal expansion.

22. The waveguide assembly of claim 1, wherein the light extraction elements are part of a light extractor plate.

23. The waveguide assembly of claim 22, wherein the light extraction elements define a bonding region between the extractor plate and waveguide body.

24. The waveguide assembly of claim 23, wherein the reinforcement member is coupled to the waveguide assembly along one or more edges of the bonding region.

25. The waveguide assembly of claim 22, wherein the frame contacts surfaces of the light extractor plate.

26. The waveguide assembly of claim 25, wherein the frame is a clamping frame having one side coupled to the waveguide body and opposing side coupled to the light extractor plate.

27. The waveguide assembly of claim 1, wherein the light extraction elements are arranged in an array.

28. The waveguide assembly of claim 1, wherein the light extraction elements define a light emission region.

29. A waveguide assembly comprising:
a waveguide body and light extraction elements bonded to the waveguide body, wherein at least one reinforcement member comprises a frame contacting surfaces of the waveguide body at one or more locations along a light emitting side of the waveguide body to reduce deflection of the waveguide assembly under an applied flexural load, the at least one reinforcement member further comprising one or more frame mechanical fasteners passing through the waveguide body, wherein the frame and the waveguide body comprise apertures for receiving the frame mechanical fasteners, the apertures having diameters permitting independent expansion and/or contraction movements between the frame and waveguide body.

30. The waveguide assembly of claim 29, wherein optical efficiency of the waveguide assembly is reduced less than 5 percent by the reinforcement member.

31. The waveguide assembly of claim 29, wherein the reinforcement member precludes debonding of the light extraction elements under the applied flexural load.

32. The waveguide assembly of claim 31, wherein the applied flexural load is at least 50 pounds.

33. The waveguide assembly of claim 31, wherein the applied flexural load is sufficient to de-bond one or more of the light extraction elements from the waveguide body in absence of the reinforcement member.

34. The waveguide assembly of claim 29, wherein the frame and the waveguide body are constructed of materials having mismatched coefficients of thermal expansion.

\* \* \* \* \*